W. McFARLIN.
Flood Fence.
No. 79,141.
Patented June 23, 1868.
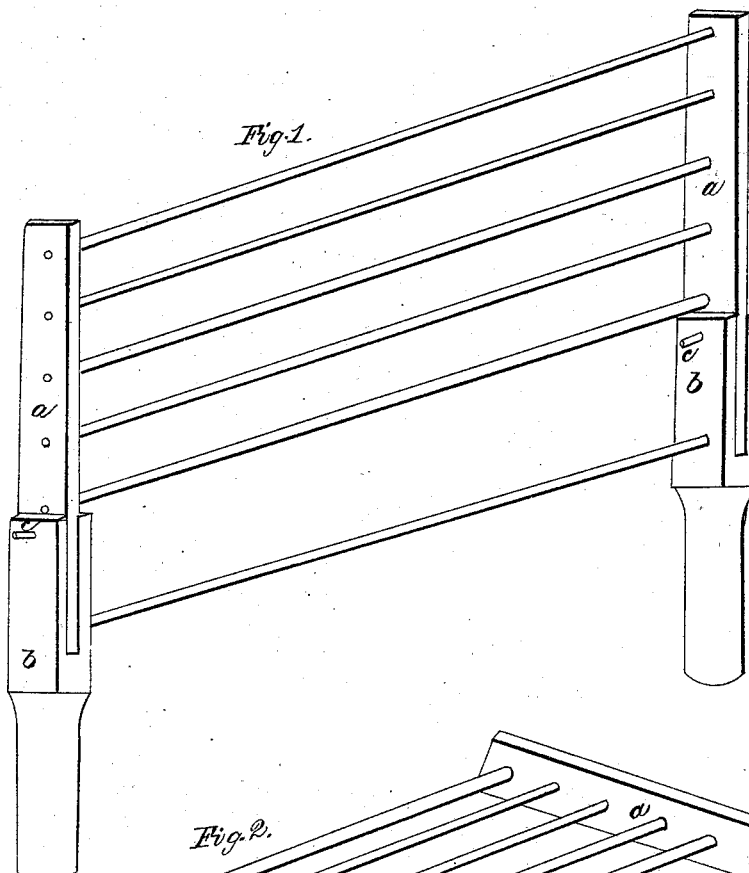
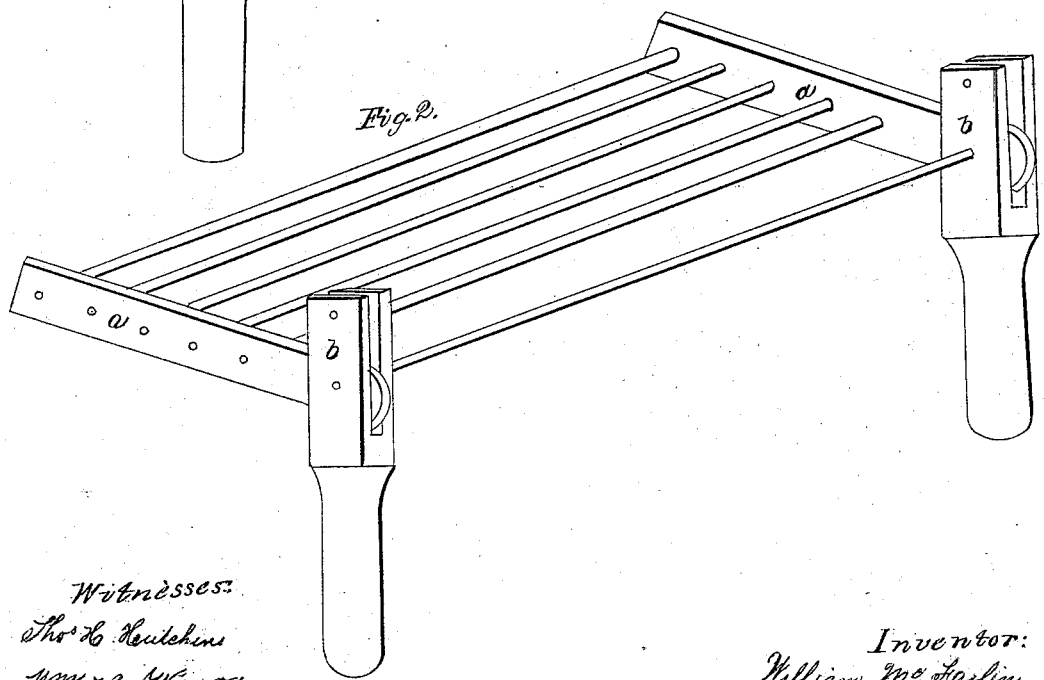

United States Patent Office.

WILLIAM McFARLIN, OF JACKSON, ILLINOIS.

Letters Patent No. 79,141, dated June 23, 1868.

IMPROVEMENT IN FENCE FOR CROSSING STREAMS.

The Schedule referred to in these Letters Patent and making part of the same.

Be it known that I, WILLIAM McFARLIN, of the town of Jackson, in Will county, and State of Illinois, have invented a new and improved Fence for Crossing Streams; and I do hereby declare that the following is a full, clear, and exact description thereof, reference being had to the accompanying drawings, making a part of this specification.

Figure 1 represents a single length of fence as it appears standing in its natural position, and Figure 2 represents the same as it appears when let down for the purpose of allowing the water to pass over in time of a freshet.

I construct the fence of iron, or other suitable material, using for the posts a bar of iron, $a$, of sufficient strength, hinged into the jaw, $b$, at the lower end, which is set firmly into a foundation in the bottom of the stream. $c$ represents a bolt, or it may be a wooden pin, passing through the jaw and post, as shown fig. 1, in order to hold the fence upright. If the pin $c$ be of wood, the force of the water and floating drift pressing against the fence will break the pin, and allow the fence to fall over, as shown in fig. 2, so that the water may pass over, and prevent the fence being washed away. The lengths may be separate or joined, as may be necessary. If separate, the jaws $b$ are double, so as to admit two posts.

The fence is intended more especially for streams with rock bottoms, where it is not practicable to build ordinary fences, and for streams subject to sudden rises.

What I claim as new in my invention, and desire to secure by Letters Patent, is—

The construction and arrangement of the devices described, substantially as and for the purposes set forth.

WILLIAM McFARLIN.

Witnesses:
    THOS. H. HUTCHINS,
    F. B. COCHRANE.